April 18, 1950          W. L. LEWIS          2,504,137

AIRPLANE PROPULSION AND STABILIZING DEVICE

Filed Aug. 24, 1942          3 Sheets-Sheet 1

INVENTOR
WILLIAM L. LEWIS
BY HARRIS, KIECH, FOSTER & HARRIS
Clarence F. Kiech
FOR THE FIRM
ATTORNEYS.

April 18, 1950 W. L. LEWIS 2,504,137
AIRPLANE PROPULSION AND STABILIZING DEVICE
Filed Aug. 24, 1942 3 Sheets-Sheet 2

INVENTOR
WILLIAM L. LEWIS
BY
HARRIS, KIECH, FOSTER & HARRIS

FOR THE FIRM

ATTORNEYS.

April 18, 1950 W. L. LEWIS 2,504,137
AIRPLANE PROPULSION AND STABILIZING DEVICE
Filed Aug. 24, 1942 3 Sheets-Sheet 3

INVENTOR
WILLIAM L. LEWIS
BY
HARRIS, KIECH, FOSTER & HARRIS
Clarence F. Kiech
FOR THE FIRM
ATTORNEYS.

Patented Apr. 18, 1950

2,504,137

UNITED STATES PATENT OFFICE 2,504,137

AIRPLANE PROPULSION AND STABILIZING DEVICE

William L. Lewis, Glendale, Calif.

Application August 24, 1942, Serial No. 456,116

15 Claims. (Cl. 244—13)

My invention relates to airplanes and refers especially to an airplane approaching the all-wing type.

Prevalent types of aircraft are found upon analysis to have many serious disadvantages and defects. For example, conventional aircraft afford very poor visibility, favor vibration, are structurally inefficient, and are far from being ideally streamlined. Since the aircraft engines, especially forwardly positioned engines, largely determine the configurations of conventional aircraft, and since the space requirements dictated by the engine are greater than the space requirements for men and equipment, aircraft bodies are commonly excessively large and aerodynamically far short of ideal.

In the present disclosure I propose an airplane that may be aptly termed a "mono-surface" type in that the lifting surfaces and control surfaces of the airplane are, in effect, one. In profile the fuselage is similar in shape to the main airfoil sections, the fuselage being a continuation of the airfoil configuration expanded to accommodate accessories, equipment, armament, cargo, and crew. Because the fuselage has the same general configuration as the airfoil portion proper of the aircraft, the combination of fuselage and airfoil portions results in drag coefficient substantially equal to the drag coefficient of a wing alone.

Certain general advantages of the all-wing type of airplane over conventional aircraft are well known, but usually such advantages are obtained at the cost of creating new problems and new disadvantages. The general object of the present invention is to avoid certain serious disadvantages and problems associated both with conventional aircraft and with aircraft of the substantially all-wing type and to achieve certain ends and certain special advantages heretofore unattained in either type.

One primary purpose of my invention is to devise an internal arrangement of aircraft components and accessories in combination with internal frame structure to permit an aircraft configuration that is determined substantially solely by aerodynamic considerations. In other words, I propose to reduce greatly, if not entirely eliminate, the heretofore unsolved conflicts between, on one hand, the desirability of streamlining an airplane for maximum aerodynamic effect and, on the other hand, the necessity of equipping the airplane with an engine, providing space for the crew and suitably disposing or arranging the engine accessories, control elements, and armament.

With reference to the configuration of the aircraft, the present invention has the following objects: to gain certain advantages in performance and in other respects by purely design features rather than by simply increasing the available power; to provide a configuration that is highly efficient, if not ideal aerodynamically; to provide a wing configuration of low aspect ratio that affords certain advantages more than offsetting any disadvantages that may inhere in the low aspect ratio; to provide wing sections of relatively long chord to attain interior depth and yet hold to a desirable low-drag airfoil configuration with a low thickness ratio; to provide a configuration permitting fuel supply to be concentrated in mass for minimizing vulnerability in combat and for minimizing the weight of the fuel container in proportion to the fuel capacity; to provide a combined configuration of fuselage and wing to accommodate an engine of larger size relatively than heretofore possible; to provide a configuration affording maximum visibility from the pilot's station; to provide a configuration substantially free from minor obstructions to air flow over the airplane surfaces; to provide an aircraft in which elements of configuration serve dual purposes, a fin, for example, having an aerodynamic function as well as heat-exchange function; to provide a configuration that logically leads to a simple structure well adapted for inexpensive mass production and assembly line fabrication; to provide a configuration peculiarly suited to plastic construction; to provide a configuration in which right and left structural elements and/or upper and lower structural elements, are identical and therefore interchangeable, such configuration resulting in elimination of dies and reducing the number of parts to be stocked for repairs.

As for the structural organization of my aircraft, objects of the present invention include the following: to provide framework wholly suited to a configuration, which configuration has been approached and developed without any concern whatsoever for structural consideration; to provide framework for supporting various parts, accessories, and equipment of the aircraft efficiently and with economy of structure; to provide a basic structure or frame that efficiently ties in with such purposes as the support of the aircraft power plant, the support of the forward gun, the support of the forward seat and control, the support of the retracted landing gear, etc.; to provide an aircraft framework having greater strength at zones of greater load; to provide a structural organization in which elements thereof perform dual functions; to provide a structural organization in which a member thereof serves both as a frame element and an armor plate; to provide a structural organization in which certain elements serve both as part of the main frame of the aircraft and as an engine base or mounting; to provide a structural organization in which a group of elements both constitute a part of the aircraft frame and constitute a detachable and interchangeable base for a replaceable unit, such a unit comprising for example the engine, supercharger, engine cooling system, etc.; to provide an aircraft framework to carry substantially all of the aircraft stresses whereby unstressed wall portions, for example, a nose portion of the fuselage, may be removable for inspection, servicing, and other purposes; to provide a framework that includes a keel structure to minimize the hazard to the pilot of a crash landing; to provide a framework together with an airplane configuration that results in minimum structure for maximum loads and maximum aerodynamic effect; to provide a basic framework together with an aircraft configuration making possible the positioning of the power plant at or near the center of gravity of the aircraft; to provide a basic framework in combination with an aircraft configuration that permits the use of a relatively large engine for a fuselage of given cross-sectional area; to provide a framework in combination with an airplane configuration to permit one basic aircrcraft to be employed both for relatively slow trainers and for high-powered fighters, whereby trainees may from the start handle the type of aircraft employed in ultimate combat; and to provide a framework together with an aircraft configuration in which various engines may be employed and may be readily substituted one for another, whereby only a small stock of replacement engines may be required for a large fleet of airplanes.

Certain objects of my invention relate to the manner in which parts, accessories, equipment and other aircraft components are disposed, arranged, and organized to achieve various desirable ends contributing to the efficient performance of the aircraft. Among these objects are the following: to provide an arrangement that is compact and yet affords adequate space requirements for various elements involved; to provide a novel disposition or organization of aircraft components that permits the designer to adhere to an aerodynamically ideal aircraft configuration; to provide a new disposition in which the location of the engine is such that the engine does not dominate the aircraft configuration and in fact need not be even a minor design factor in arriving at the ultimate configuration of the aircraft; to provide a disposition or organization of aircraft components that avoids the necessity of providing heavy forward beams to support the power plant; to provide a disposition or arrangement permitting the engine load to be placed directly on the ultimate supporting structure, i. e., on the wing beams of the airplane; to provide an arrangement that avoids, on one hand, the necessity of running air passages to trailing portions of the aircraft wing or, on the other hand, the necessity of cutting through ribs to carry the discharge portions of such ducts to the fuselage; to provide an organization of components together with an aircraft configuration permitting the placing of air ducts and/or controls under the aircraft engine; to provide an organization whereby all major loads may be placed on a keel structure of the airplane; to provide a disposition of the aircraft parts and fittings in which certain related elements including the engine and associated devices are grouped together so that the group may be installed or removed as a unit; to provide a disposition or organization of the aircraft interior that inherently minimizes engine vibration; and to provide an arrangement that minimizes engine noise at the pilot's station.

Other objects of my invention relate to the utilization of fluid dynamics for contributing power to the aircraft in the course of flight. Among these objects are: to provide a discharge passage for an action similar to rocket propulsion; to convert heat losses into power by heat exchange with fluid in a suitable exhaust passage; to provide for gaseous discharge directly into the aircraft propeller; and to employ a variable-direction gaseous discharge to serve in effect as a substitute for a variable-pitch propeller arrangement.

Aside from directly affecting power, my further purposes with respect to fluid passages in the aircraft are: to provide a fluid passage means that will cool compressed air from a supercharger prior to delivery of the compressed air to the engine; to provide a fluid passage for heat transfer from the liquid cooling system of the engine; to provide a fluid passage means and arrangement for muffling the exhaust gases of the engine; to provide fluid passage means arranged to conceal incandescent exhaust gases, thereby avoiding visibility at night; to provide fluid passage means for the prevention of icing of the aircraft propellers; to provide for a single fluid duct serving several purposes simultaneously; to provide a cooling duct that serves additionally as an aerodynamic fin; to provide a fluid duct that serves both as a fresh air intake for the aircraft radiator and as a passage for directing exhaust gases to the supercharger of the aircraft; and to provide a cooling-fluid passage that functionally cooperates with the landing gear mechanism, whereby the landing gear serves as automatic valve means to open the passage for maximum flow on the ground and to restrict the passage for minimum flow in the course of flight.

Still further objects of my invention relate to the air-screw arrangement for propelling the aircraft, namely: to provide propellers that may be operated at high crank-shaft speed; to provide propellers suitable for pusher propulsion; to provide a propeller construction and arrangement having inherently minimum tip losses; and to provide a propeller arrangement involving minimum aerodynamic losses attributable to interfering surfaces near the propeller.

In one form of the new aircraft it is my object to provide a seat that may be released by the occupant to drop with the occupant away from the airplane in a safe manner.

An important object of my invention, as will be apparent hereinafter, is to combine all the numerous features mentioned above in a unitary manner, with dovetailing in space and function and with minimum conflict and compromise, all to the end that the resultant aircraft will fly and maneuver in an outstanding manner.

All of the above objects and advantages, as well as additional objects and advantages, will be apparent in the following description, taken with the accompanying drawings.

In the drawings, which are to be considered as illustrative only:

Figs. 1 to 13 show how the principles of my invention may be embodied in a mono-surface type fighter. It will be apparent to those skilled in the art that the same principles may be embodied in various types of aircraft, and it will be further apparent that many of the described features may be used apart from a mono-surface type of aircraft.

In this fighter an airplane body 10 approaching the "all-wing" type has a fuselage portion 11 and two wing portions 12, these three portions merging to form an aerodynamic combination offering minimum drag and minimum air-flow disturbance. By virtue of a novel organization to be described later and by virtue of a novel arrangement of the components, equipment, and accessories of the aircraft, as will be described later, the designer following the principles of my invention is entirely free to concentrate on aerodynamic factors in arriving at the configuration of the body 10. The designer must, of course, provide sufficient room for the crew and therefore will decide upon a minimum fuselage diameter for the fighter of, say, sixty inches.

A circular cross-sectional configuration for the fuselage portion 11 is desirable for pressurizing, as well as to assure a light, strong, and easily fabricated structure. Since it is desirable that a relatively low thickness ratio be maintained throughout for the sake of minimum drag, and, on the other hand, since it is desirable to provide substantial depth in the wing portions 12 adjacent the fuselage portion 11, the wing portions have relatively long chords at stations adjacent the fuselage portion. It is a fortunate fact that the desirability of such long chords is consonant with the substantially all-wing configuration and simplifies the merging of the wing portions with the fuselage portion for overall efficiency. Since the resultant configuration is such that the body 10 may completely encompass the various components, equipment, and accessories of the airplane, the exterior of the airplane is substantially free from minor obstructions to air flow. Preferably, the fuselage portion 11 extends forward of the wing portions 12 to form a protruding nose 13 such as to provide an exceptional range of visibility at the pilot's station.

One of the important features of the airplane shown in Figs. 1 to 6 is that the configuration of the body 10 may be symmetrical with respect to a vertical plane through the axis of the fuselage portion 11 and/or symmetrical with respect to a laterally extending plane through the same axis. Such a configuration permits the use of a single set of dies for right and left portions of the airplane body 10 and/or a single set of dies for upper and lower portions of the body. The resulting economies and speed in fabrication are readily appreciated.

On opposite sides of the nose 13 the leading edge of the body 10 may be provided with a number of portholes 16 for machine guns (not shown). The nose 13, the structure of which includes a transparent shell 17 for the pilot station, is provided with a forward porthole 18 to accommodate a light cannon 20. Such a cannon may be adjustable vertically about an axis at the porthole. At the trailing edge of the body 10 are an outer pair of ailerons 21 and an inner pair of elevators 22, the ailerons being employed for rolling control as well as for change in direction and the elevators being employed to control the pitch of the airplane.

Since low aspect wings such as shown are theoretically not the most efficient aerodynamically, it may seem at first thought that the low aspect ratio of the body 10 involves serious penalty. Whatever penalty is involved here is, however, more apparent than real. There is little value in using a wing of conventional aspect ratio at the cost of placing various parts and devices outside of the airfoil configuration and at the further cost of resorting to relatively heavy structure and having available only shallow space within the wing. The overall performance of the present overall configuration in excelling the performance of other configurations indicates that the low aspect ratio is not significant in my design.

In my preferred arrangement shown in the drawings, I tend to counteract any penalties inherent in the low aspect ratio by mounting airfoils 23 on the wing tips of the wing portions 12. Such vertical airfoils also provide directional stability and additionally reduce tip losses and tip stalling. If it is found that the vertical airfoils 23 tend unduly to restrict visibility, they may be formed largely of transparent plastic.

Figure 6:
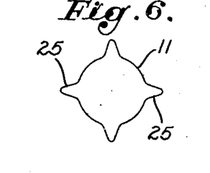
Fig. 6 is a transverse section taken as indicated by the line 6—6 of Fig. 4.

The preferred embodiment of the invention illustrated in Figs. 1 to 6 is further characterized by the provision of suitable radial fins 25 on the trailing end of the fuselage portion 11, the radial fins being directly ahead of the airplane propeller 26. Fig. 6 indicates that there may be four such radial fins and further indicates that the fins may be formed in effect by hollow folds in the wall of the fuselage portion 11. Note that two of the fins 25 may be at the trailing edges of the wing portions 12. Aerodynamically, the fins 25 serve as air stream directors and directional stabilizers. A feature of my invention is that the fins 25 may have further functions, including the function of an external radiator and the function of a fluid passage for cooperation with the propeller 26, both of which functions will be described later.

Figure 4:
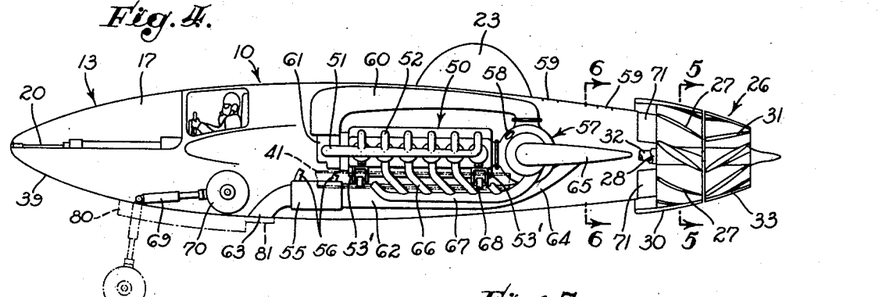
Fig. 4 is a simplified longitudinal section of the airplane.
Figure 5:
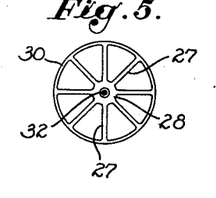
Fig. 5 is a transverse section taken as indicated by the line 5—5 of Fig. 4.

While the propeller 26 may be of any suitable type and construction, I prefer to employ propeller means characterized by a peripheral tubular housing or shell carried by the blade tips, and I further prefer to employ a dual propeller comprising two oppositely rotating units. Thus, the forward unit may comprise a series of helical blades 27 mounted on a tubular shaft 28, the helical blades carrying a tapered shell 30. As best shown in Fig. 4 the shell 30 may be of hollow construction, i. e., double-walled. Immediately adjacent the forward unit is a rearward unit comprising blades 31 on an inner shaft 32, the blades 31 being inclined oppositely of the blades 27 and carrying a tapered shell 33 that continues the configuration of the forward tapered shell 30.

Such a propeller arrangement makes it possible to increase the engine crank-shaft speeds to obtain maximum power without the necessity of considering limitiations imposed by conventional large-diameter propellers. It may be desirable in some practices of my invention to provide gears for driving the propeller units at higher speed than the engine crank shaft. Preferably, the blades of the two units are of fixed pitch to permit a very light construction in comparison with conventional propellers. The propeller shells reduce the danger of injury to persons on the ground and also make bailing out less hazardous for the crew. It may be further noted that the propeller shells reduce noise and in addition increase propulsive efficiency by reducing tip losses. A further feature is that the exhaust gases from the power plant of the airplane may be directed into such a propeller for the sake of certain advantages, in which event the propeller not only serves as a muffler but also serves to conceal incandescent exhaust gases.

Figure 2:
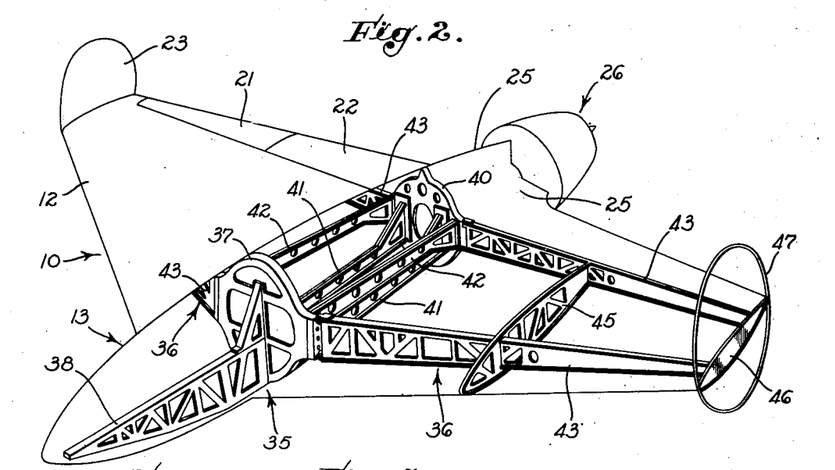
Fig. 2 is a similar view with portions of the skin removed to reveal the internal structure, certain parts and equipment being omitted for clarity.

Various frame constructions may be employed in various practices of the invention. Fig. 2 indicates the construction of an efficient and relatively light framework that may be employed together with the above described configuration in a highly advantageous manner, the framework and the airplane configuration logically matching each other. Broadly described, the depicted framework comprises both a longitudinal frame, generally indicated by the numeral 35, and two lateral frames 36 constituting wing beams for the wing portions 12. The longitudinal frame 35 includes as its principal parts a forward ring 37; a forward hollow beam member or forward keel member 38 mounted as a cantilever on the forward ring; an armor-plate 39 unitary with both the forward beam and the forward ring to stiffen the forward beam and to cooperate with the forward beam in forming a hull for the nose 13, the armor-plate being curved to conform to the configuration of the nose; a rear ring 40; a spaced pair of lower longitudinals, indicated as lower beams 41 interconnecting the two rings, and a similar upper pair of longitudinals, indicated as upper beams 42 likewise interconnecting the two rings. The pairs of beams 41 and 42 constitute in effect a beam structure between and rigidly interconnecting the two rings 37 and 40. The forward member 38, the spaced lower beams 41, and the base 53, to be later described, form a rigid keel structure for the fuselage portion 11. For reasons to be discussed later, I prefer to have at least one of the upper longitudinals 42 detachably mounted to the two rings 37 and 40. The arrangement and relatively great vertical depth of the longitudinal frame 35 saves weight since relatively light members may be used to fabricate a beam of relatively great depth to carry a given load. Each of the two lateral frames 36 comprises two converging wing spars 43 connected, respectively, to the frame rings 37 and 40 and any suitable number of wing ribs. Fig. 2 shows one wing rib 45 at any intermediate station and a rib 46 at the end of the wing, the rib 46 carrying a ring 47 to frame the corresponding vertical airfoil 23.

While I have described the airplane framework as comprising a fuselage frame and two lateral wing frames, it is apparent that the framework may be regarded as a single transverse wing beam with suitable added lonigtudinals, the single wing beam including the two rings 37 and 40. In this view, a feature of my invention is that the power plant and other heavy devices may be mounted directly on the ultimate support i. e., the wing beam.

For a proper understanding of the organizational unity achieved in the present airplane, it is necessary to consider the described framework not only with relation to the airplane configuration, but also with relation to my new principles of arranging the devices and equipment of the airplane. Neither the configuration nor the frame nor the arrangement can be properly appreciated separate and apart from the combination of the three.

Figure 3:
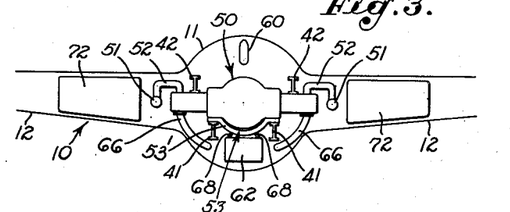
Fig. 3 is a diagrammatic fragmentary transverse section of the aircraft shown in Figs. 1 and 2.

As indicated by Fig. 3, an important feature of the present embodiment of the invention is the employment of what may be termed a flat engine or wing-type engine at a central position with lateral portions of the engine extending into the two wing portions 12 of the body 10. It is this manner of making available wing space in addition to fuselage space for the flat engine 50 that makes it possible to use the engine in a cylindrical fuselage having a diameter substantially less than the maximum width required for the engine 50 together with the fuel-mixture intake manifold 51 and fuel-mixture intake ducts 52 of the engine.

The engine is preferably positioned between the two rings 37 and 40 of the fuselage frame and preferably is mounted on a base 53 shown as a pair of cradles 53', the cradles being preferably adapted for detachable mounting on the fuselage frame and being in effect a functional but removable part of the fuselage frame and of the keel structure. The engine base may be mounted on and connected to the lower longitudinals 41 as shown, and may be a single plate or other unitary structure connected both to the forward ring 37 and to the rear ring 40.

Figure 1:
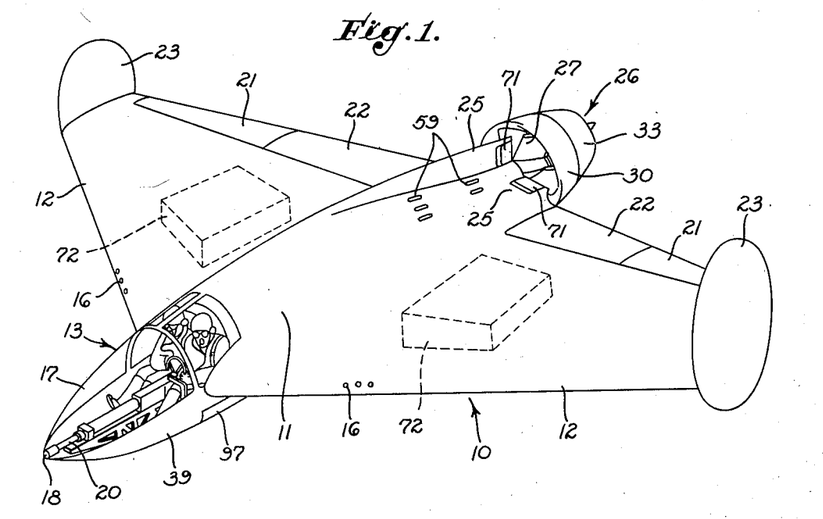
Fig. 1 is a perspective view of a fighter airplane embodying features of my invention.

The engine 50 is provided with a liquid cooling system including a radiator 55 provided with two pipes 56 for liquid circulation. Also associated with the engine is a pair of turbo-superchargers 57 having ports 58 to receive fresh air, the fresh air entering the airplane through surface ports 59 (Figs. 1 and 4). The intake of air through the surface ports 59 serves a useful purpose in the boundary layer or laminar flow of the airstream along the periphery of the airplane.

The compressed fresh air from the supercharger is led by an overhead duct 60 to the carburetor 61 of the engine, from which carburetor the previously mentioned intake manifold 51 extends on opposite sides of the engine. It is to be noted as a feature of the invention that the overhead duct 60 is a narrow passage of relatively great vertical depth fitting into the uppermost radial fin 25, the radial fin thus being given the function of a surface radiator to cool the compressed air supplied by the supercharger. Such cooling is desirable because the air supply tends to reach an undesirable high temperature not only because of heat of compression, but also because the supercharger is driven by the hot exhaust gases of the engine.

While the radiator 55 may be air-cooled in any suitable manner and while the exhaust gases may be channeled out of the airplane in any suitable manner, it is a feature of my preferred embodiment that the cooling of the radiator and the channeling of the exhaust gases are interrelated in a novel manner. Directly under the engine 50 is a relatively large air passage 62 extending rearward from an intake port 63 past extensive surfaces of the radiator 55 to the power intake of the turbo-supercharger 57 and dividing into two conduit means or branches 64, the branches connecting with two corresponding discharge passages 65 directed into the atmosphere. The discharge passages 65 in effect provides continuations of the branches 64 of the air passage 62. The various exhaust pipes 66 on each side of the engine 50 lead into an exhaust manifold 67 that is directed into the corresponding supercharger 57 to energize the supercharger. From superchargers the exhaust gases are released into the two discharge passages 65 to add kinetic energy to air flow from the large passage 62.

Preferably not only the engine 50 but also various elements and devices associated with the engine are removable with the base 53 formed, for example, by the cradles 53', the various elements connected with the base constituting a quickly replaceable power plant unit. Thus, in addition to the engine 50, the base 53 may support any combination of the following elements: the radiator 55; any desired portion of the air passage 62; the two superchargers 57; the discharge passages 65; and the overhead duct 60. Fig. 3 shows the air passage 62 connected to a cradle 53 by attachment means 68. Since the engine 50 is located approximately at the center of gravity of the airplane, engines of various sizes and various types may be employed interchangeably, and if complete power plant units are mounted on the interchangeable bases 53, or other interchangeable frame structure, substitutions of power plants may be made with little loss of time. Important advantages may be readily perceived. In a training program for pilots, the trainees may progress by stages from low powered and relatively slow airplanes to the ultimate high-powered airplanes for combat, the same basic aircraft structure being employed throughout the training course. Only a relatively small number of spare power plants is required for the maintenance of a fleet of aircraft, and it is a simple matter to adapt numerous types of available engines to such aircraft.

It is noteworthy that the framework of the airplane varies in strength approximately in accord with the distribution of load, and it is further noteworthy that the greatest stresses are transmitted directly to the airplane frame. Thus, the base 53 carrying the power plant and associated elements is mounted directly on the keel structure, the forward cannon 20 is mounted directly on the keel structure, and the shock-absorber strut 69 carrying the forward landing wheel 70 is likewise mounted directly on the keel structure. In addition, the keel structure will carry most of the elements of the control system for the aircraft also frameworks supporting the nose section.

Figures 7, 8, 12, 13:
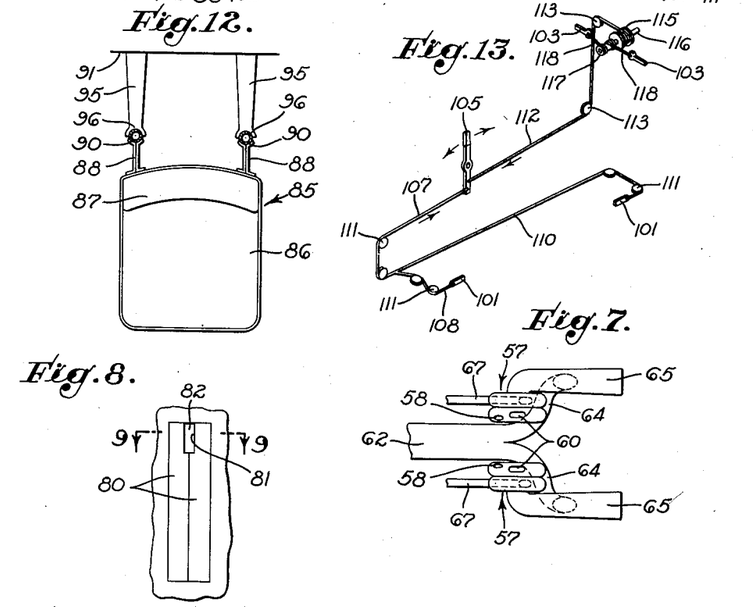
Fig. 7 is a plan view of certain ducts associated with the superchargers of the aircraft.
Fig. 8 is a bottom view of doors for the forward landing wheel.
Fig. 12 is a transverse section taken along the line indicated by the arrow 12 in Fig. 11.
Fig. 13 is a diagrammatic representation of the control system for releasing the two seats.
Figure 9:
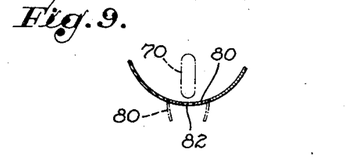
Fig. 9 is a section taken as indicated by the line 9—9 of Fig. 8.
Figure 10:
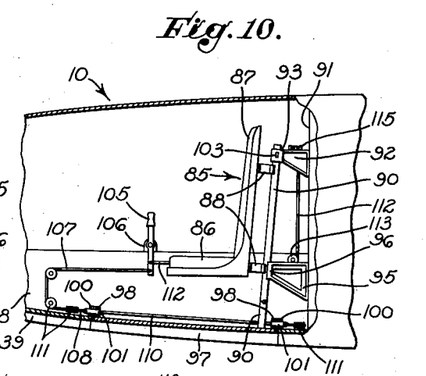
Fig. 10 is a fragmentary side elevation of the aircraft with the skin broken away to show a pair of releasable seats.
Figure 11:
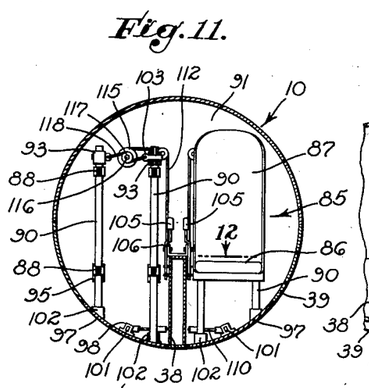
Fig. 11 is a front elevation of the seat arrangement with one seat member removed to reveal the supporting structure.

In the arrangement illustrated in the drawings the landing wheel 70 retracts into a space formed in the forward hollow beam or keel member 38 and when retracted the space is normally closed in by a pair of doors 80 shown in bottom view in Fig. 8, in cross section in Fig. 9, and in dotted lines in Fig. 4. The doors 80 not only close off from below the space in which the landing wheel 70 is retracted, but also extend across the entrance or intake port 63 of the air passage 62. The swinging edges of the two doors are cut away to form recesses 81, the two recesses cooperating to define a restricted opening 82 for the air passage 62 when the two doors are closed. Since the two doors are necessarily open when the landing wheel 70 is extended while the airplane is on the ground, maximum air flow through the passage 62 is assured whenever the airplane is stationary. On the other hand, since the two doors 80 are normally closed while the airplane is in flight, the two doors serve as means for automatically restricting flow through the air passage 62 while the airplane is cruising. Thus, the doors serve as an automatic valve mechanism to permit maximum flow through the air passage while the aircraft is on the ground and to restrict air flow when the airplane is in flight. During flight, the opening must be restricted to allow sufficient air for cooling and to reduce drag of the opening to a minimum. If such restriction is not provided, the high pressure at the intake end of the air passage 62 tends to cause excessive air flow in the passage with excessive cooling action on the radiator 55.

In some practices of my invention the discharge passages 65 may have merely the function of releasing their gaseous content to the atmosphere. An important feature of the present airplane, however, is that the discharge passages 65 have one or more functions in addition to the simple function of conducting their gaseous content to the atmosphere. In the depicted arrangement, there are two such discharge passages 65 exending into two of the radial fins 25 of the fuselage portion 11. The discharge passages 65 may extend either into the two vertical fins or into the two horizontal fins or may branch to extend into all four fins. These discharge passages 65 are of tapering configuration and are so dimensioned for the volume of gaseous flow therethrough as to accelerate the gas flow to a velocity substantially in excess of the air speed of the aircraft, the result being that the discharge of the gaseous mixture creates by reaction a propulsive force to boost the speed of the airplane.

Since the discharge passages 65 terminate in the ends of the radial fins 25, the gaseous discharge is directed into the propeller 26 for certain desirable effects. The exhaust gases prevent icing of the propeller and the exhaust gases are muffled and hooded by the propeller against observation. A feature of my preferred arrangement is the employment of pivotally mounted vanes 71 at the ends of the radial fins 25 to provide deflecting surfaces. Such vanes vary the direction of gaseous discharge from the two horizontal fins 25 relative to the propeller. It is contemplated that the adjustment of the vanes 71 will be directly under the control of the pilot at all times and will afford the pilot something equivalent to variable pitch control notwithstanding the fact that the blades of the propeller are actually fixed in pitch. When these vanes 71 are tilted out of normal fore-and-aft alignment in unison for an effect that is either clockwise or counterclockwise, the directions of the two jets of gaseous discharge are varied accordingly. As a result of the concerted effect of the two jets and additionally as a result of the deflecting action of the vanes on the external air stream, the angle of entrant air flow relative to the propeller 26 is varied. The aerodynamic effect of varying the angle of entrant corresponds to varying the angle of attack of the propeller blades. The two vertical fins 25 do not serve as jet passages, but the vanes 71 on the vertical fins acting on the external airstream have the same effect as the vanes on the horizontal fins.

To reveal further the manner in which my arrangement is based upon the optimum positioning of the various parts and devices of the aircraft, attention is directed to the location of the fuel tanks 72 indicated in dotted lines in Fig. 1 and solid lines in Fig. 3. As previously stated, the two wing portions 12 have relatively low thickness ratios with consequent low drag, but have relatively long chords at stations adjacent the fuselage portion 11. Such a configuration provides space of substantial vertical dimension within the wing portions 12 for the fuel tanks 72 and the exceptional vertical dimension of the fuel tanks makes it possible to concentrate the fuel mass, thereby not only saving weight and material in the construction of the fuel tanks, but also reducing the area of the fuel target in combat and increasing maneuverability of the airplane. The concentration of the fuel masses also permits placing the guns in the wings closer than usual to the center line of the aircraft with consequent reduction in yawing reaction to firing of the guns.

My described design is intended to facilitate inspection, servicing, and fueling of the airplane. The distance between the normal ground line and the axis of the airplane is sixty-nine inches in one model and all parts of the aircraft are within reach of a man on the ground. Various openings may be provided for ease of inspection. The wing gun may be inspected, serviced, and loaded from wheel wells (not shown) in the two wings.

In my preferred construction of this airplane, I provide releasable seats by which the pilot and copilot may drop out of the bottom of the airplane in an emergency, this feature of the invention being shown in detail in Figs. 10 to 13.

There are two releasable seats, one for the pilot and one for the copilot. Each seat includes a seat member generally designated 85 having a seat portion 86 and a back portion 87. It is contemplated that the seat member 85 will drop through to bottom of the airplane with the occupant and that the back portion 87 of the seat member will be relatively extensive to serve as a protector for the back of the occupant's head as the seat passes through the floor of the airplane.

Each of the seat members 85 is mounted by suitable brackets 88 on a pair of upright tubes 90, any suitable provision being made for adjustment of the seat member to the convenience of the user. Behind the pilot and copilot is a bulkhead 91 reinforced by the previously mentioned forward ring 37 of the airplane framework, and mounted on this bulkhead behind each seat is an upper pair of brackets 92 with cylindrical portions 93 to slidingly receive the upper end of the upright tubes 90 and a lower pair of brackets 95 formed with cradles 96 to contact the upright tubes from the rear.

Below each of the two seats the armor plate 39 of the airplane includes a removable panel portion 97 to serve as an emergency escape door, the removable portion of the armor plate being by preference cut with a marginal flange to form an overlapping joint with the fixed portion of the armor plate. To hold the panel 97 in normal closed position, the panel may be provided with forward and rearward ears 98 that register with complementary fixed ears 100 on the floor of the airplane cabin, the complementary pairs of ears being adapted to hold the panel in place by removable retaining pins 101. Each of the removable panels 97 carries on its inner surface a pair of socket members 102 to releasably seat the lower ends of the corresponding upright tubes 90, it being contemplated that the panels 97 will readily fall away from the two upright tubes whenever the two retaining pins 101 are withdrawn to release the panels. To releasably hold the upright tubes 90 in place in the absence of the floor panel 97, the cylindrical portions 93 of the upper brackets 92 may be apertured to receive retaining pins 103 that normally extend through the upright tubes.

Adjacent each of the seat members 85 within convenient reach of the occupant is an emergency release or escape lever 105 pivotally mounted on a bracket 106. Attached to the emergency lever 105 is a cable 107 which, as best shown in Fig. 13, has two branches 108 and 110 connected respectively to the panel-retaining pins 101, the cable and its branches passing around various pulleys 111 in a manner to permit the retaining pins to be withdrawn in response to operation of the emergency lever. Also attached to the emergency lever 105 is a cable 112 which passes around a pair of pulleys 113 and is terminally wound around a drum 115 keyed to a small shaft 116. Also keyed to the small shaft 116 is a smaller drum 117 on which are wound ends of two short cables 118 attached to the retaining pins 103 at the upper ends of the upright tubes 90.

The manner in which the seat mechanism functions in an emergency may be readily understood from the foregoing description. If the occupant first moves the emergency escape lever 105 forward, the lower retaining pins 101 will be withdrawn to cause the floor panel 97 to drop away from the airplane, whereupon subsequent rearward movement of the escape lever by the occupant of the seat will withdraw the upper retaining pins 103 to permit the upright tubes 90 with the seat element 85 attached thereto to drop through the floor of the airplane. It is to be noted that the upright tubes 90 are inclined to lie against the cradles 96 of the lower brackets 95 so that when a seat is released, the inclined upright tubes 90 sliding downward through the cradles 96 are urged slightly forward to cause the released seat structure to clear the rearward edge of the floor opening.

It is apparent that the operation of the emergency escape lever 105 may be reversed to produce the same effect. In other words, the emergency escape lever 105 may first be pulled rearward to withdraw the upper retaining pins 103 and then pushed forward to withdraw the lower retaining pins 101, the withdrawal of the upper retaining pins releasing the upright tubes 90 to rest on the floor panel 97 and the subsequent withdrawal of the lower retaining pins 101 releasing the floor panel to permit the seat structure to drop through the floor opening.

It is to be noted that the emergency lever 105 must be moved by substantial amounts in two opposite directions from a normal central position to drop a seat from the airplane. Accidental or inadvertent movement of the lever in only one direction will not suffice and it is extremely unlikely that both of the required movements will be caused accidentally or inadvertently.

Figure 14:
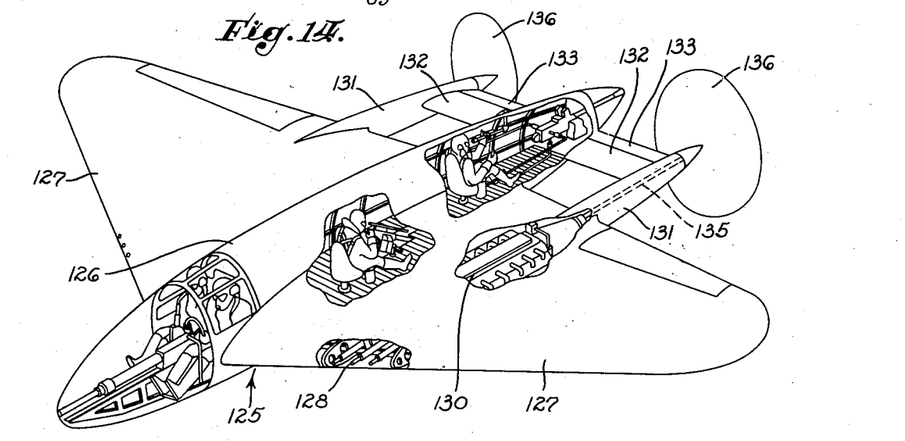
Fig. 14 is a perspective view of a large fighter plane, parts being broken away to reveal the interior arrangement.

Fig. 14 indicates in a general manner how the principles of my invention may be embodied in a long range fighter carrying a crew of four men. The general configuration of the body 125 in Fig. 14 is the same as heretofore described, the body comprising a fuselage portion 126 and two wing portions 127. Mounted in each of the wing portions 127 are the usual machine guns 128 and a suitable power plant 130. Extending rearward from each wing portion 127 is a boom 131, the two booms being connected to the trailing end of the fuselage portion 126 by means of horizontal stabilizers 132. Mounted on the horizontal stabilizers 132 are elevators or balancing surfaces 133 that are under control of the pilot and serve to control the pitch of the aircraft and additionally to compensate for shifts in weight distribution caused by movements of the crew. A drive shaft 135 extends from each of the power plants 130 through the corresponding boom 131 to a suitable propeller 136 at the end of the boom.

Figure 15:
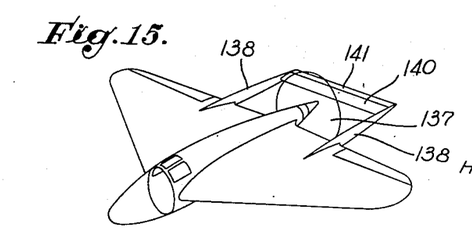
Fig. 15 is a perspective view on a reduced scale of another embodiment of my invention.

Fig. 15 shows a further embodiment of my invention constructed in accord with the various principles heretofore explained. In this particular aircraft the power plant (not shown) is mounted in the fuselage portion of the body and is directly connected to a propeller 137 on the trailing end of the fuselage portion. Two booms 138 extend rearward on opposite sides of the propeller 137 and are spanned by a horizontal stabilizer 140. Mounted on the stabilizer 140 under control of the pilot is an elevator 141, the elevator being directly in the slip stream of the propeller.

The description herein in more or less specific detail of preferred embodiments of my invention, for the purpose of illustration and to exemplify the principles involved, will suggest to those skilled in the art various changes and substitutions based upon my underlying concepts, and I reserve the right to all such departures from my disclosure that lie within the scope of my appended claims.

I claim as my invention:

1. In an airplane adapted to be driven by an internal combustion engine supplied with compressed air by a turbo supercharger driven by exhaust gases from the engine, the combination of: walls defining an air passage providing a forward air intake port through which a stream of air enters to traverse said air passage; a cooling system for said engine including a heat exchanger and means for mounting same to receive at least a portion of said air stream entering said air intake port, said air stream being heated during passage through said heat exchanger; walls defining a discharge passage terminating in a rearwardly-directed discharge port of relatively small cross-sectional area discharging rearwardly into the atmosphere; means for conducting spent exhaust gases from said turbo supercharger into one end of said discharge passage to move therealong and from said discharge port; and a conduit means communicating with said air passage and with said discharge passage at an intermediate position between said end thereof and said discharge port for delivering to said discharge passage at said intermediate position at least a portion of the heated air stream from said heat exchanger.

2. A combination as defined in claim 1, in which said conduit means comprises a conduit directed rearwardly into said discharge passage at said intermediate position.

3. In combination in an airplane: a body carried by the airplane and providing a rear portion; a first propeller including a hub disposed immediately to the rear of said rear portion and a plurality of propeller blades extending outwardly from the hub into the air; a second propeller including a hub disposed immediately rearwardly of the hub of said first propeller and a plurality of propeller blades extending outwardly from said hub of said second propeller, the blades of said propellers being oppositely pitched; means extending from said rear portion for oppositely rotating said propellers; a first tubular housing secured to the blades of said first propeller to rotate therewith in the air stream, said first housing providing a forward portion concentric with and of greater diameter than said rear portion of said body; and a second tubular housing secured to the blades of said second propeller to rotate therewith in the air stream, said second tubular housing being aligned with said first tubular housing.

4. A combination as defined in claim 3, in which said first and second tubular housings are tapered inwardly and rearwardly to form rearwardly converging spaces, the blades of the first and second propellers being disposed respectively in said spaces, said first tubular housing having a rear portion adjacent and aligned with a front portion of said second tubular housing.

5. An airplane having: a fuselage wall forming an external longitudinal fin; an internal combustion engine near said fuselage wall; a supercharger for said engine; and means including a compressed-air duct extending from said supercharger to said engine longitudinally through said fin, whereby the fin serves both as an aerodynamic member in the external air stream and as a surface-type radiator with substantial area in the external air stream for removing heat from the compressed air supplied by the supercharger.

6. An airplane having: an internal combustion engine; a propeller driven by said engine and having blades rotatable in the air to drive said airplane; a cooling system for said engine including a heat exchanger; walls defining an air passage providing an air intake port and at least one discharge port forward of said propeller and directed into the zone of rotation of said blades, the air entering said air intake port traversing said heat exchanger before discharge through said discharge port; means to deliver exhaust gases from said engine into said passage downstream from said heat exchanger; and manually controlled means for varying the direction relative to said propeller at which the air and exhaust gases are discharged from said discharge port into the zone of rotation of said blades.

7. An airplane having: an internal combustion engine; a propeller driven by said engine and and having blades rotatable in the air to drive said airplane; a supercharger driven by the exhaust gases of the engine for supplying compressed air to said engine; a cooling system for said engine including a heat exchanger; walls defining an air passage providing an air intake port and at least one discharge port forward of said propeller and directed into the zone of rotation of said blades, the air entering said air intake port traversing said heat exchanger before discharge through said discharge port; means to deliver exhaust gases from said supercharger into said passage downstream from said heat exchanger to provide energy for the gaseous stream directed by said passage means towards said propeller; and manually controlled means for varying the direction relative to said propeller at which said gaseous stream is discharged from said discharge port into the zone of rotation of said blades.

8. An airplane having: a propeller having blades adapted to rotate in the air to drive the airplane; an engine operatively connected with said propeller; aerodynamic stabilizing means in the external air stream ahead of and extending rearwardly toward said propeller, said stabilizing means being hollow; means for supplying to said hollow stabilizing means a relatively moving stream of hot gases heated by said engine; and nozzle means connected with said stabilizing means for discharging said hot gases from said stabilizing means into the zone of rotation of said blades to impinge on said blades during their rotation, the discharge of said nozzle means being relatively small in cross section and directing said stream of hot gases at high velocity against said blades during their rotation and providing jet propulsion effect.

9. An airplane as in claim 8 including movable wall means aligned with said stabilizing means and rearward thereof, said movable wall means providing surfaces for variably deflecting the stream of hot gases emitted by said nozzle means.

10. A combination as in claim 9 wherein said aerodynamic stabilizing means is in the form of several aerodynamic stabilizers longitudinally and radially disposed about the axis of said propeller, there being a movable wall means aligned with each stabilizer.

11. An airplane as in claim 10 wherein each wall means is a vane extending rearward into the external air stream, means being included for moving the vanes to either side of their aligned position, said moving means acting to move said vanes together to deflect the corresponding streams of hot gases and change the entrant angle at which they enter the zone of rotation of said blades.

12. An airplane as in claim 8 wherein the greatest dimension of said nozzle means lies along a corresponding radius of said zone of rotation of said propeller blades.

13. An airplane comprising in combination: a fuselage providing forward and rearward portions; a power plant carried by said fuselage; a cooling system for said power plant including a heat exchanger; walls carried by said fuselage defining an air passage in which said heat exchanger is located and providing a forward air intake port and a rearward discharge port, whereby air enters said intake port, traverses said heat exchanger and moves to said discharge port; a retractable landing gear mounted on the airplane; means for retracting and extending the landing gear; and means connected with the landing gear for partially restricting the air flow through said passage when the landing gear is retracted and for decreasing such restriction when the landing gear is extended, whereby said passage offers relatively great freedom for air flow past said heat exchanger when the airplane is on the ground and on said landing gear while in extended position, and offers lesser freedom for air flow when the airplane is in the air and the landing gear is retracted.

14. An airplane as in claim 13 which provides a space into which said landing gear is retractable and in which the restricting means connected with said landing gear includes: door means carried by said fuselage; means for mounting said door means on said fuselage to move from open position providing for extension of said landing gear to a closed position; and means connecting said door means with said landing gear for movement of said landing gear and door means in synchronism, said door means partially restricting air flow through said passage when in said closed position.

15. In combination in an airplane: a rearwardly-extending propeller shaft; a body surrounding said shaft and providing a rear portion; a propeller mounted on said propeller shaft and including a hub disposed rearwardly of said rear portion of said body and a plurality of propeller blades extending outwardly from said hub into the air whereby rotation of said propeller drives said airplane; and a tubular housing secured to said blades to rotate therewith in the air stream about the axis of said propeller shaft, said tubular housing forming an enclosure for the outer portions of said propeller blades and providing a forward portion concentric with and of greater diameter than said rear portion of said body, said body being provided with radially and longitudinally disposed external stabilizing members disposed in the air stream at a position forward of said propeller blades, means being provided in said stabilizing members for discharge of hot gaseous fluid through said stabilizers toward said propeller blades and into said housing, said housing encompassing said hot gaseous fluid as delivered thereto.

WILLIAM L. LEWIS.

REFERENCES CITED

The following references are of record in the file of this patent:

UNITED STATES PATENTS

| Number | Name | Date |
|---|---|---|
| 1,037,658 | Rabbitt | Sept. 3, 1912 |
| 1,160,021 | Watson | Nov. 9, 1915 |
| 1,270,649 | Murray | June 25, 1918 |
| 1,386,493 | Guyot | Aug. 2, 1921 |
| 1,516,295 | Huntington | Nov. 18, 1924 |
| 1,564,354 | Junkers | Dec. 8, 1925 |
| 1,624,475 | Coe | Apr. 12, 1927 |
| 1,782,072 | McKinstry | Nov. 18, 1930 |
| 1,810,762 | Gish | June 16, 1931 |
| 1,847,094 | Martin | Mar. 1, 1932 |
| 1,859,807 | Stout | May 24, 1932 |
| 1,862,102 | Stout | June 7, 1932 |
| 1,880,520 | Stout | Oct. 4, 1932 |
| 1,929,778 | Goddard | Oct. 10, 1933 |
| 1,942,674 | Whitsett | Jan. 9, 1934 |
| 1,968,227 | Smith | July 21, 1934 |
| 1,970,565 | Kean | Aug. 21, 1934 |
| 1,972,190 | Gregg | Sept. 4, 1934 |
| 2,060,387 | Wallis | Nov. 10, 1936 |
| 2,087,832 | Birkigt | July 20, 1937 |
| 2,111,318 | Droz | Mar. 15, 1938 |
| 2,113,692 | Hughes et al. | Apr. 12, 1938 |
| 2,132,529 | Firner | Oct. 11, 1938 |

(Other references on following page)

UNITED STATES PATENTS

| Number | Name | Date |
|---|---|---|
| 2,140,783 | Bellanca | Dec. 20, 1938 |
| 2,160,281 | Price | May 30, 1939 |
| 2,164,545 | Rogers | July 4, 1939 |
| 2,169,243 | Higbie | Aug. 15, 1939 |
| 2,191,842 | Back | Feb. 27, 1940 |
| 2,194,596 | Henter | Mar. 26, 1940 |
| 2,219,980 | De Seversky | Oct. 29, 1940 |
| 2,233,031 | Price | Feb. 25, 1941 |
| 2,242,198 | Woods | May 13, 1941 |
| 2,272,626 | Starke | Feb. 10, 1942 |
| 2,274,442 | Woods | Feb. 24, 1942 |
| 2,286,908 | | |
| 2,312,473 | | |
| 2,388,247 | | |
| 2,396,911 | | |

| Number | Name | Date |
|---|---|---|
| 2,286,908 | Goddard | June 16, 1942 |
| 2,312,473 | O'Hare | Mar. 2, 1943 |
| 2,388,247 | Berkow | Nov. 6, 1945 |
| 2,396,911 | Anxionnaz | Mar. 19, 1946 |

FOREIGN PATENTS

| Number | Country | Date |
|---|---|---|
| 472,555 | Great Britain | Sept. 27, 1937 |
| 499,004 | Great Britain | Jan. 17, 1939 |
| 504,539 | Great Britain | Apr. 26, 1939 |
| 546,588 | Great Britain | July 20, 1942 |